United States Patent
Hinokio et al.

(10) Patent No.: US 9,193,310 B2
(45) Date of Patent: Nov. 24, 2015

(54) VEHICULAR DOOR TRIM

(71) Applicant: TOYOTA BOSHOKU KABUSHIKI KAISHA, Aichi-ken (JP)

(72) Inventors: Makoto Hinokio, Aichi-ken (JP); Bongkee Kim, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 80 days.

(21) Appl. No.: 14/222,966

(22) Filed: Mar. 24, 2014

(65) Prior Publication Data

US 2014/0306481 A1   Oct. 16, 2014

(30) Foreign Application Priority Data

Apr. 10, 2013 (JP) ................................. 2013-081884

(51) Int. Cl.
*B60R 13/02* (2006.01)

(52) U.S. Cl.
CPC ......... *B60R 13/0206* (2013.01); *B60R 13/0243* (2013.01); *B60R 2013/0281* (2013.01)

(58) Field of Classification Search
CPC .. B60R 13/02; B60R 13/0206; B60R 13/0243
USPC ............................................. 296/146.7, 1.08
See application file for complete search history.

(56) References Cited

U.S. PATENT DOCUMENTS

| | | | | |
|---|---|---|---|---|
| 7,823,947 B1 * | 11/2010 | Parkinson et al. | ......... | 296/37.13 |
| 8,141,933 B2 * | 3/2012 | Nakamura | ................. | 296/146.7 |
| 2007/0059487 A1 * | 3/2007 | Dooley et al. | ................. | 428/137 |
| 2013/0140846 A1 * | 6/2013 | Montoya et al. | ........... | 296/146.7 |
| 2013/0154304 A1 * | 6/2013 | Tobey et al. | ................. | 296/146.7 |
| 2014/0300133 A1 * | 10/2014 | Hinokio et al. | ............. | 296/146.7 |

FOREIGN PATENT DOCUMENTS

| | | | |
|---|---|---|---|
| DE | 102012008032 A1 | * | 10/2013 |
| JP | 2012-086775 | | 5/2012 |

* cited by examiner

*Primary Examiner* — H Gutman
(74) *Attorney, Agent, or Firm* — Greenblum & Bernstein, P.L.C.

(57) ABSTRACT

A door trim includes an ornament and a trim board. The ornament includes a decoration main body having ornament fitting portions at its peripheral edge portion, and an ornament insertion portion. The trim board includes a trim main body, a receiving portion, and an extending portion. The trim main body has an opening to which the decoration main body is fitted and an opening edge portion on which the fitting portions are located. The receiving portion receives the ornament insertion portion so as to be exposed on a side of the outer peripheral portion of the trim main body. The extending portion extends from the receiving portion to a space in the opening. The extending portion includes a mount seat to which a stopper member is mounted, and the door trim is mounted to a door panel via the stopper member.

12 Claims, 12 Drawing Sheets

VEHICULAR DOOR TRIM

CROSS REFERENCE TO RELATED APPLICATION

This application claims priority from Japanese Patent Application No. 2013-81884 filed on Apr. 10, 2013. The entire contents of the priority application are incorporated herein by reference.

FIELD OF THE INVENTION

The present disclosure relates to a vehicular door trim.

BACKGROUND OF THE INVENTION

A vehicular door includes a door panel and a door trim that is mounted on a vehicular interior side with respect to the door panel. Such a door trim includes a main body that configures a most part of the door trim and an ornament that is assembled to the main body as a separate part. The main body of the door trim has an opening through which the ornament is mounted to the main body from a back-surface side of the main body. The ornaments are mounted in several portions of the door trim according to a design or a function that is required for the door trim.

Such a door trim is mounted to the door panel with using a clip. The main body of the door trim has a clip seat on its back surface that faces the door panel. The clip is supported and held by the clip seat and the door trim is mounted to the door panel via the clip that is held by the clip seat.

The clip seats are arranged along a peripheral edge of the main body of the door trim. The clip seats are arranged in several portions according to a shape of the door trim.

SUMMARY OF THE INVENTION

In response to a request of improving a design of the door trim, the ornament may be required to be arranged in the portion of the door trim where the clip seat is arranged. In such a case, the opening through which the ornament is mounted to the door trim is required to be located in the position where the clip seat is arranged. However, the clip seat cannot be arranged in the opening. Therefore, the clip seat may be arranged on a back-surface side of the ornament.

However, if the clip seat is arranged on the ornament, a molding error such as a sink mark may be occurred on a surface of the ornament that is a surface opposite to the surface where the clip seat is arranged, that is a surface of the ornament that faces the vehicular interior side.

The ornament may be arranged on the door trim to keep away from the clip seat and this may restrict a design of the door trim.

An objective of the present technology is to provide a technology with which an ornament is mounted to a door trim such that mount seats are arranged in a peripheral portion of the door trim and an arrangement position of the ornament overlaps a mount position where one of the mount seats is mounted without deteriorating a design of the door trim. A stopper member that is used when the door trim is mounted to the door panel is mounted to one of the mount seats.

According to the present technology, a door trim includes an ornament and a trim board. The ornament includes a decoration main body having a peripheral edge portion, ornament fitting portions at the peripheral edge portion of the decoration main body, and an ornament insertion portion at an end portion of the decoration main body. The trim board includes a trim main body, a receiving portion, and an extending portion. The trim main body has a plate shape having an outer peripheral portion and has an opening to which the decoration main body is fitted and the opening being through a thickness of the trim main body. The trim main body further has an opening edge portion defining the opening, and the fitting portions of the ornament are located on the opening edge portion. The trim board includes the receiving portion near the outer peripheral portion and the receiving portion is configured to receive the ornament insertion portion with the ornament insertion portion being on a vehicular interior side relative to the receiving portion such that the ornament insertion portion is exposed on a side of the outer peripheral portion of the trim main body. The extending portion extends from the receiving portion to a space in the opening and is located to overlap the space in the opening on a vehicular exterior side relative to the decoration main body that is fitted to the opening. The extending portion includes a mount seat to which a stopper member is mounted, and the door trim is mounted to a door panel via the stopper member.

DETAILED DESCRIPTION OF EMBODIMENTS

<First Embodiment>

Figure 1:
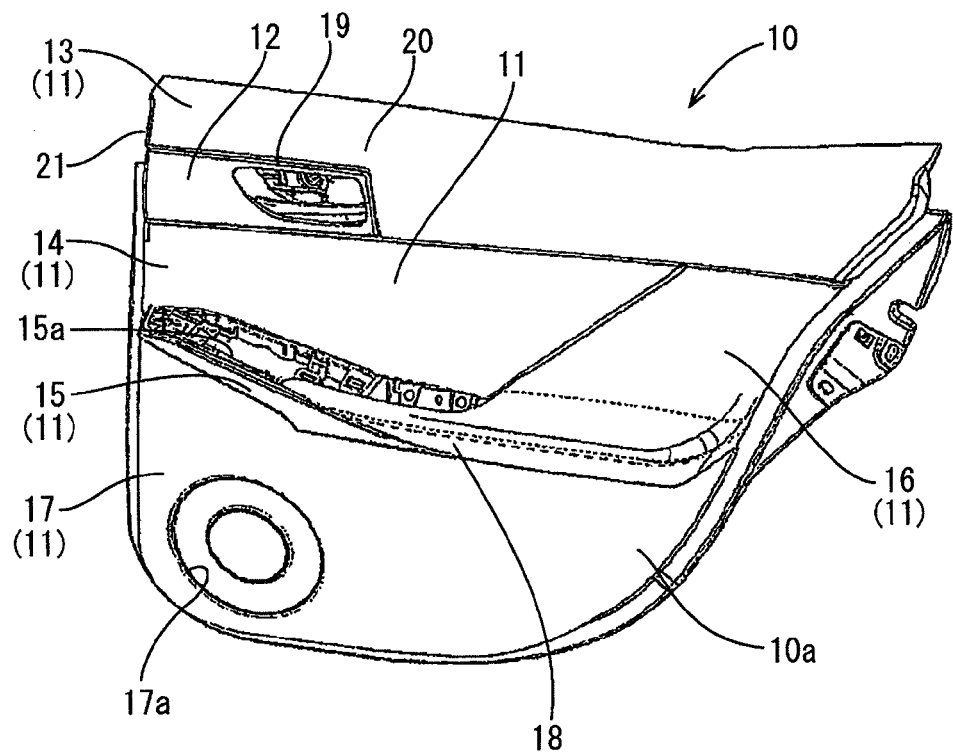
FIG. 1 is a plan view illustrating a door trim according to one embodiment of the present technology.

A first embodiment will be described with reference to FIGS. 1 to 12. In this embodiment, a door trim that is mounted to a door panel of a vehicular door will be described as an example. A door trim 10 that is seen from a vehicular interior side is illustrated in FIG. 1. A front surface 10a side of the door trim 10 is illustrated in FIG. 1. A left side in FIG. 1 corresponds to a vehicular front side and a right side in FIG. 1 corresponds to a vehicular rear side. An upper-lower direction in FIG. 1 corresponds to an upper-lower direction of a vehicle (a vehicular compartment).

The door trim 10 is an vehicular interior side part of the vehicular door and mounted to a door inner panel (an example of the door panel) of the vehicular door from the vehicular interior side. As illustrated in FIG. 1, the door trim 10 mainly includes a trim board 11 and an ornament 12.

The trim board 11 configures a main part of the door trim 10 and is formed in a plate shape having a predetermined thickness as a whole. For example, the trim board 11 is formed by molding with using a synthetic resin material such as thermoplastic resin (for example, polypropylene). A material of the trim board 11 is not necessarily a synthetic resin material but may be a mixture of a plant fiber (such as kenaf) and a synthetic resin.

The trim board 11 includes a plurality of parts. The trim board 11 includes an upper board 13, a middle board 14, a first armrest board 15, a second armrest board 16, and a lower board 17. The trim board 11 is formed by assembling the boards 13-17.

The upper board 13 is an upper portion of the trim board 11 and the lower board 17 is a lower portion of the trim board 11. The middle board 14 corresponds to a front side portion of the trim board 11 that is located on a lower side of the upper board 13. The first armrest board 15 and the second armrest board 16 form an armrest 18 that is located in a middle portion of the door trim 10 so as to extend in a vehicular front-rear direction. The armrest 18 is formed to be projected toward the vehicular interior side as a whole. The first armrest board 15 is a front part of the armrest 18 and the second armrest board 16 is a rear part of the armrest 18. The middle board 14 is located on an upper side of the first armrest board 15 and the upper board 13 is located on an upper side of the second armrest board 16. The lower board 17 is located on a lower side of the armrest 18 including the first armrest board 15 and the second armrest board 16.

An upper surface of the first armrest board 15 is provided with a mount through hole 15a through which a switch base (not illustrated) is mounted. The switch base includes a switch operation part (not illustrated) such as a switch for lifting and lowering a window glass. The lower board 17 includes a speaker grill 17a.

A skin material may be adhered to surfaces of the boards 13-17 of the trim board 11, if necessary. Examples of the skin material include leather such as natural leather or synthetic leather, or a fabric such as a woven fabric, a knitted fabric, or a non-woven fabric.

As described before, the trim board 11 is formed by assembling the boards 13-17. As a whole, the trim board 11 includes a trim main body 20 and a side wall portion (a flange portion) 21. The trim main body 20 is formed in a plate and is arranged such that a back surface thereof faces the door panel. The side wall portion 21 extends from an outer peripheral portion 24 of the trim main body 20 toward the door panel or toward the vehicular exterior side.

The ornament 12 is a part of the door trim 10 and the trim board 11 and the ornament 12 form a part of the door trim 10. The ornament 12 is arranged to decorate the door trim 10. The ornament 12 is provided independently from the trim board 11. The ornament 12 is located in a front portion of the door trim 10 and between the upper board 13 and the middle board 14. The ornament 12 is made by molding with using a synthetic resin material similar to the trim board 11.

The trim board 11 has an opening 22 between the upper board 13 and the middle board 14. The ornament 12 is mounted to the trim board 11 through the opening 22 and forms a part of a design surface (a front surface) 10a of the door trim 10. An inside door handle 19 is mounted to the ornament 12. Namely, the ornament 12 functions as a part (an inside handle bezel) via which the inside door handle 19 is mounted to the door trim 10 (the trim board 11).

Figure 2:
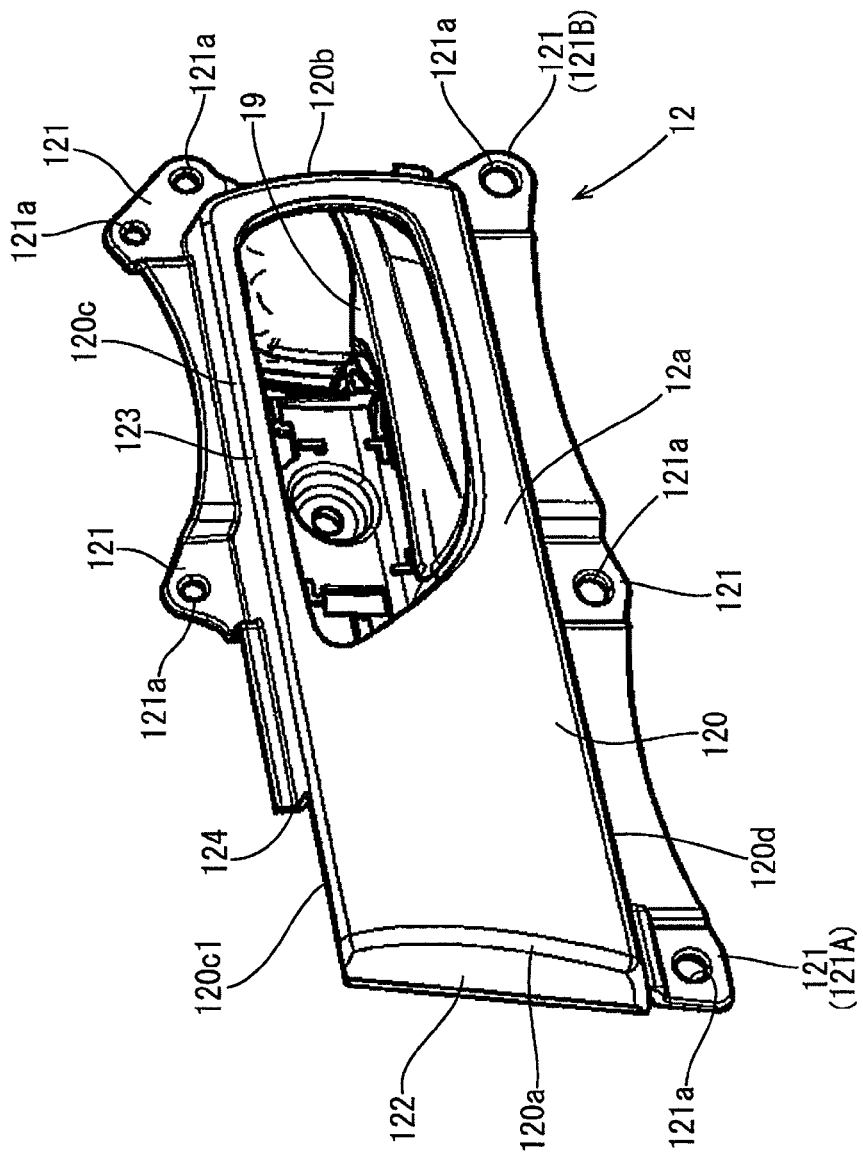
FIG. 2 is a perspective view illustrating an ornament seen from a front surface side.
Figure 3:
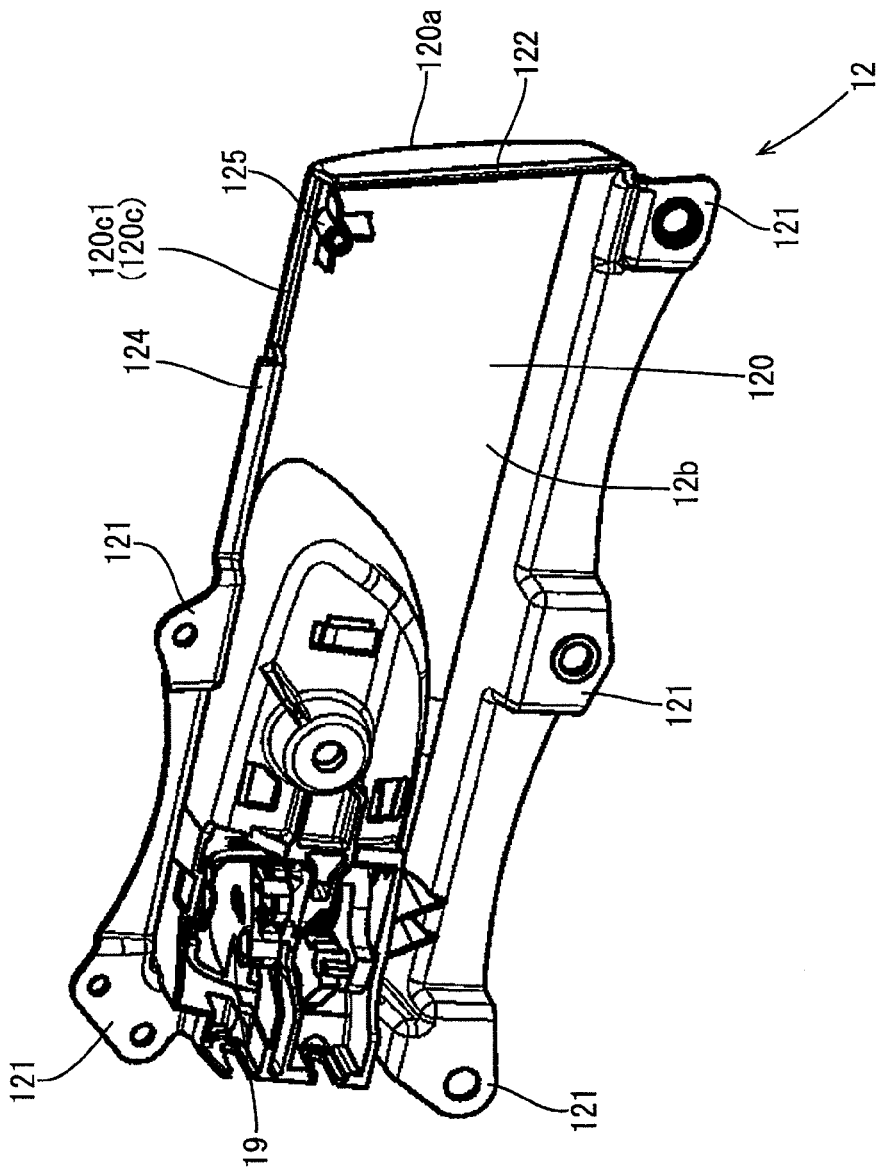
FIG. 3 is a perspective view illustrating the ornament seen from a back surface side.

FIG. 2 is a perspective view of the ornament 12 seen from a front surface 12a side, and FIG. 3 is a perspective view of the ornament 12 seen from a back surface 12b side. The ornament 12 mainly includes a decoration main body 120 and fitting portions 121.

The decoration main body 120 is formed in a plate extending along the vehicular front-rear direction as a whole and has a substantially elongated rectangular shape seen from the vehicular interior side with respect to a vehicular width direction. The decoration main body 120 has an insertion portion 122 at a front end portion 120a. The insertion portion 122 is a wall extending from the front end portion 120a toward the door panel (the vehicular exterior side). The inside door handle 19 is mounted to the decoration main body 120 in a rear end portion 120b of the ornament 12. The decoration main body 120 and the insertion portion 122 of the ornament 12 are exposed to the vehicular interior side through the opening 22 when the ornament 12 is mounted to the trim board 11. This improves a design of the door trim 10.

Multiple fitting portions 121 are arranged on a peripheral edge portion 123 of the decoration main body 120. The fitting portions 121 are fixed to the trim board 11 on the back surface 19b of the trim board 11 when the ornament 12 is mounted to the trim board 11. The peripheral edge portion 123 of the decoration main body 120 includes a front end portion 120a, a rear end portion 120b, an upper end portion 120c, and a lower end portion 120d. The fitting portion 121 is arranged on the rear end portion 120b, the upper end portion 120c, and the lower end portion 120d and not arranged on the front end portion 120a.

Each fitting portion 121 is formed in a flat plate having a mount hole 121a. The fitting portion 121 is arranged on about a middle portion and a rear end portion of the elongated upper end portion 120c. The fitting portion 121 is arranged on a front end portion, about a middle portion, and a rear end portion of the elongated lower end portion 120d. The fitting portion 121 that is arranged on the rear end portion of the upper end portion 120c extends to a part of the rear end portion 120b of the decoration main body 120. Namely, the fitting portion 121 is arranged on a corner located between the upper end portion 120c and the rear end portion 120b. The fitting portion 121 that is arranged on the rear end portion of the lower end portion 120d extends to a part of the rear end portion 120b of the decoration main body 120. Namely, the fitting portion 121 is arranged on a corner located between the lower end portion 120d and the rear end portion 120b.

On the peripheral edge portion 123 of the decoration main body 120, the upper end portion 120c includes a contact portion 124. The contact portion 124 is used when the ornament 12 is mounted to the trim board 11. The contact portion 124 extends from the upper end portion 120c of the peripheral edge portion 123 toward the door panel (to the vehicular exterior side) and is arranged on a front side portion of the upper end portion 120c of the decoration main body 120. A portion 120c1 of the upper end portion 120c that is located between the front end portion 120a and the contact portion 124 is referred to as an upper front end portion 120c1. No fitting portion 121 is arranged on the upper front end portion 120c1 and the upper front end portion 120c1 just extends straight along a longitudinal direction of the decoration main body 120 (along the vehicular front-rear direction). The upper front end portion 120c1 is recessed from the contact portion 124 toward the vehicular interior side.

A mount projection such as a mount boss 125 is formed on a back surface 12b of the decoration main body 120. The mount boss 125 is secondarily used when the ornament 12 is mounted to the trim board 11. The mount boss 125 is arranged near a corner of the decoration main body 120 that is located between the front end portion 120*a* and the upper end portion 120*c* (the upper front end portion 120*c*1). The mount boss 125 has a substantially a tubular shape or a cylindrical shape and extends from the back surface 12*b* toward the door panel (toward the vehicular exterior side). A height (a length) of the mount boss 125 from the back surface 12*b* is lower (shorter) than a height (a length) of the insertion portion 122 or the upper front end portion 120*c*1 from the back surface 12*b*. Accordingly, the mount boss 125 does not obstruct mounting of the ornament 12 to the trim board 11.

Figure 4:
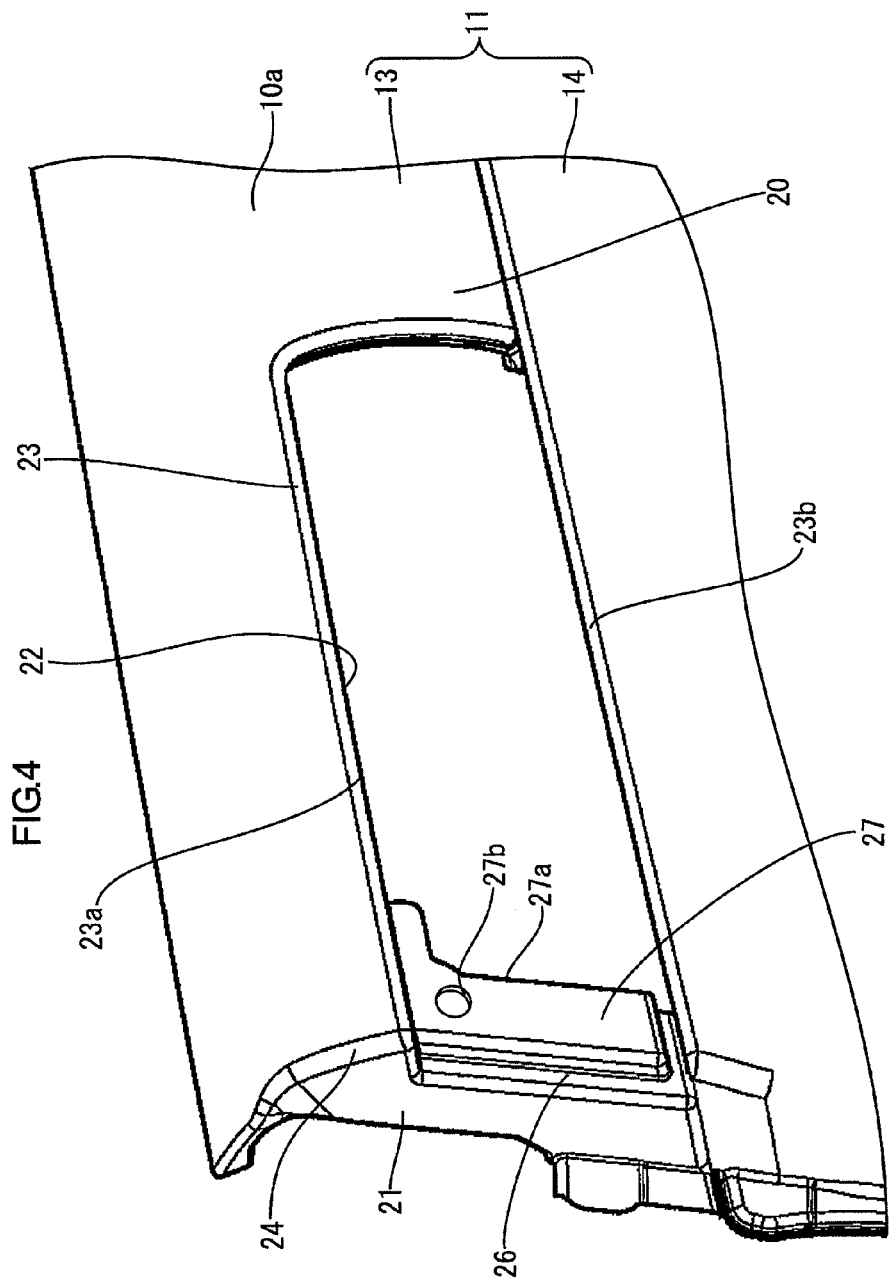
FIG. 4 is an enlarged perspective view illustrating a part of a trim board near an opening seen from the front surface side.

A portion of the trim board 11 near the opening 22 viewed from the front surface 10*a* side is illustrated in FIG. 4. As illustrated in FIG. 4, a front-side portion of the trim board 11 has the opening 22 through which the ornament 12 is mounted. The trim board 11 has the opening 22 between the upper board 13 and the middle board 14. The opening 22 is open through a thickness of the trim main body 20 of the trim board 11. As illustrated in FIG. 4, the opening 22 is formed to extend along the vehicular front-rear direction and has a substantially elongated rectangular shape with a plan view seen from the front-surface 10*a* side. The trim main body 20 has the opening 22 in its front-side portion so as to cross the outer peripheral portion 24 of the trim main body 20 that extends in an upper-lower direction. Namely, the trim main body 20 has the opening 22 in its front-side portion so as to cross the side wall portion 21 that extends along the upper-lower direction and open at a front side of the trim board 11. The trim main body 20 has an opening edge 23 that forms an edge of the opening 22.

The decoration main body 120 of the ornament 12 is fitted to the opening edge 23 to cover the opening 22 when the ornament 12 is mounted to the trim board 11. The opening edge 23 includes a lower edge portion 23*a* of the upper board 13 and an upper edge portion 23*b* of the middle board 14. The opening edge 23 forms a peripheral edge of the opening 22 and is formed in a frame shape that is open at a front side (the outer peripheral portion 24 side) of the trim board 11. Namely, when the ornament 12 is mounted to the trim board 11, the opening edge 23 surrounds three sides of the rectangular decoration main body 120 and one side of the decoration main body 120 is exposed.

Figure 5:
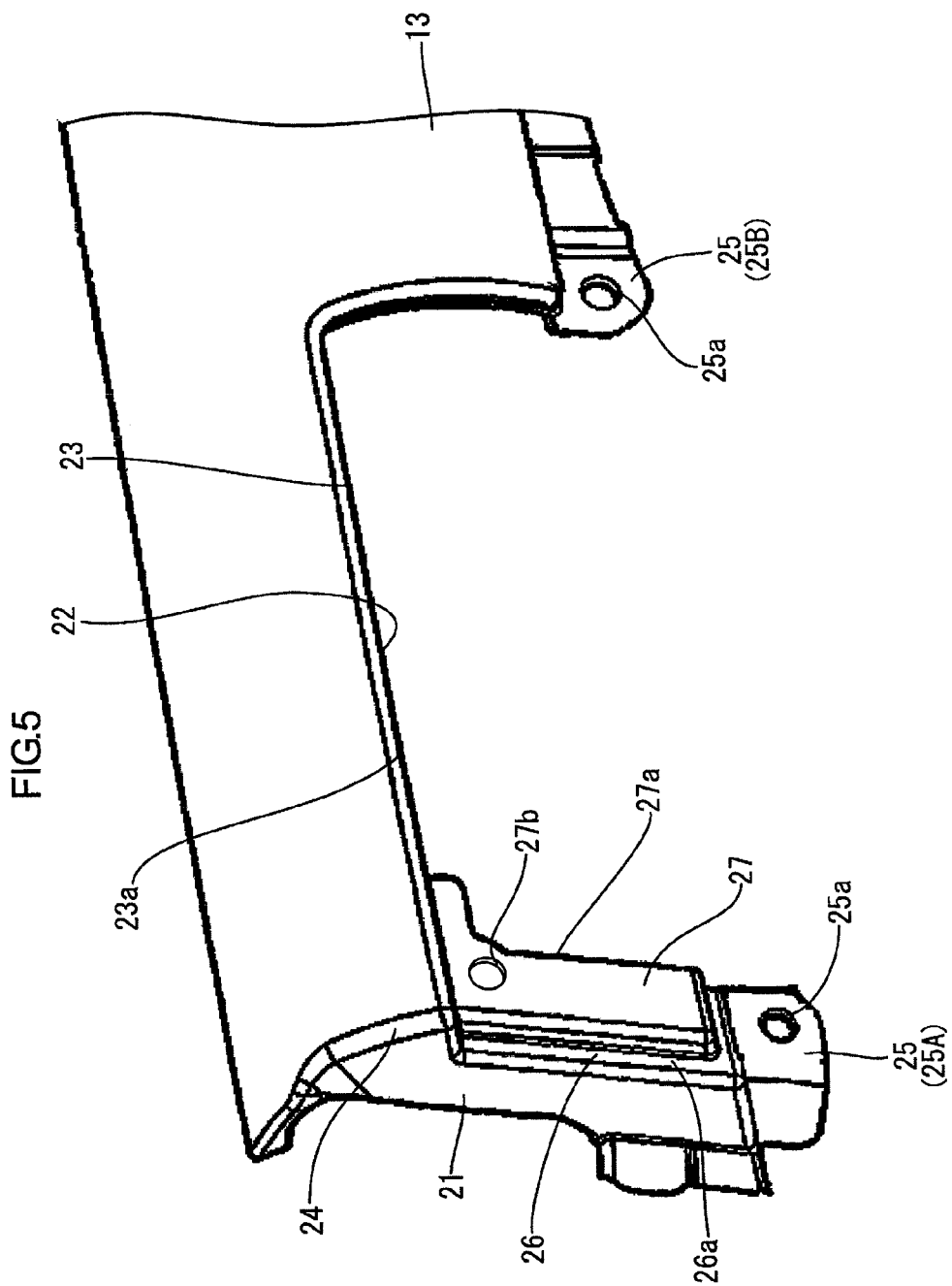
FIG. 5 is an enlarged perspective view illustrating a part of an upper board near an opening seen from the front surface side.

A portion of the upper board 13 near the opening 22 that is seen from the front surface 10*a* side is illustrated in FIG. 5. In FIG. 5, the middle board 14 is removed from the trim board 11 in FIG. 4. As illustrated in FIG. 5, the upper board 13 includes fixing portions 25 on its lower end portion. The fixing portions 25 are fixed to the middle board 14. The fixing portion 25 is arranged on a front end side and a rear end side of the opening edge 23. Each fixing portion 25 is formed in a flat plate having a mounting hole 25*a* therein. The fixing portions 25 are used when the middle board 14 is mounted to the upper board 13 and when the ornament 12 is mounted to the trim board 11.

Figure 6:
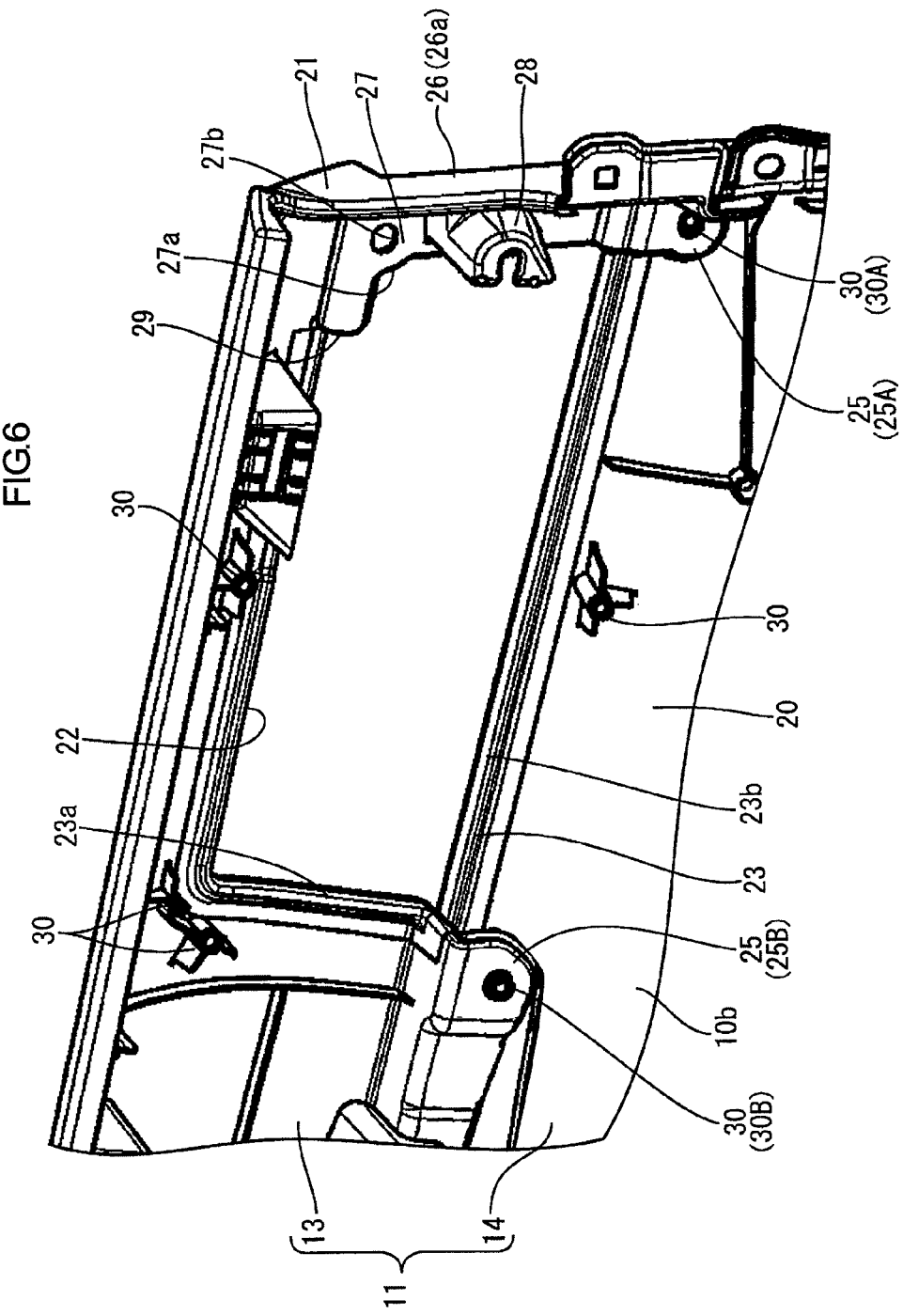
FIG. 6 is an enlarged perspective view illustrating a part of the trim board near the opening seen from the back surface side.

As illustrated in FIGS. 4 and 5, the trim board 11 includes a receiving portion 26. The receiving portion 26 receives the insertion portion 122 of the ornament 12 from the back surface 12*b* side such that the insertion portion 122 is located on the vehicular interior side relative to the receiving portion 26 when the ornament 12 is mounted to the trim board 11. The upper board 13 includes the receiving portion 26 as a part thereof. Specifically, the side wall portion 21 that is a front end portion of the upper board 13 (the outer peripheral portion 24 of the trim main body 20) integrally includes the receiving portion 26 as a part thereof. A part of the trim board 11 near the opening 22 seen from the back surface 10*b* side is illustrated in FIG. 6. As illustrated in FIG. 6, the receiving portion 26 is included in the outer peripheral portion 24 of the trim main body 20 on the door panel side (on the back surface 10*b* side of the door trim 10) so as to extend over the opening 22 with respect to the upper-lower direction. The receiving portion 26 is formed in a straight elongated shape extending along the outer peripheral portion 24 that corresponds to the upper-lower direction.

The receiving portion 26 includes a recess portion 26*a* that is open toward the vehicular interior side or that is recessed toward the vehicular exterior side. The insertion portion 122 of the ornament 12 is received by the receiving portion 26 so as to be arranged in the recess portion 26*a*. The recess portion 26 of the receiving portion 26 is located in a space of the opening 22. The recess portion 26 is located in a space of the opening 22 that is near the outer peripheral portion 24 of the trim main body 20. The recess portion 26*a* of the receiving portion 26 is also open to the front side. An end portion of the insertion portion 122 of the ornament 12 that is received by the receiving portion 26 is exposed from the front open portion of the recess portion 26*a*.

The trim board 11 includes an extending portion 27 extending from the receiving portion 26 toward the vehicular rear side as a part thereof so as to partially overlap a space in the opening 22. The extending portion 27 extends to a space of the opening 22. A clip seat 28 is arranged on the extending portion 27 so as to be provided on the back surface 10*b* side of the extending portion 27. The clip seat 28 is used when the door trim 10 is mounted to the door panel. The extending portion 27 is formed in a plate extending from the side wall portion 21 including the receiving portion 26 toward the rear side. The extending portion 27 is included in the side wall portion 21 so as to extend over a space of the opening 22 from the door panel side (the back surface 10*b* side) similar to the receiving portion 26. The extending portion 27 is located to overlap a front side space in the opening 22 with respect to a thickness direction of the trim main body 20 (a vehicular width direction). Namely, the extending portion 27 extends to a front side space in the opening 22. The extending portion 27 is located closer to the door panel (to the vehicular exterior side) than the decoration main body 120 of the ornament 12 that is fitted to the opening 22 defined by the opening edge 23. The upper board 13 integrally includes the extending portion 27 as a part thereof.

The clip seat 28 projects from the extending portion 27 on the back surface 10*b* side to the vehicular exterior side or toward the door panel when the trim board 11 is mounted to the door panel. The clip seat 28 is located to overlap a space in the opening 22 and a part of the decoration main body 120 that is fitted to the opening 22 defined by the opening edge 23 with respect to a thickness direction of the trim main body 20. A clip (a stopper member) is mounted to the clip seat 28. The clip is used to mount the door trim 10 to the door panel. The clip seat 28 is integrally formed with the extending portion 27. Namely, the clip seat 28 is formed as a part of the extending portion 27. The clip seat 28 is arranged in an upper portion of the back surface 10*b* of the door trim 10 near the vehicular front side. Multiple clip seats (not illustrated) that are used for mounting the door trim 10 to the door panel are arranged along a peripheral edge of the door trim 10.

The extending portion 27 includes a guide member 29 at the end portion 27*a* thereof so as to overlap an upper space in the opening 22 with respect to the thickness direction of the trim main body 20. The guide member 29 is formed in a plate that extends rearward (toward an opening edge 23*a* that is located on an opposite side from the extending portion 27). When the ornament 12 is put in the opening 22 to mount the ornament 12 to the trim board 11 and the contact portion 124 of the ornament 12 is in contact with the guide member 29, the guide member 29 restricts movement of the ornament 12 and guides the ornament 12 to a correct mount position in the trim board 11.

The extending portion 27 has a mount through hole 27b in its upper portion so as to be open through the thickness direction (the vehicular width direction). When the ornament 12 is mounted to the trim board 11, the mount boss 125 arranged on the back surface 10b of the decoration main body 120 is fitted to the mount hole 27b to be mounted and fixed to the extending portion 27. A screw (not illustrated) is inserted through the mount hole 27b from the back surface 10b side and threaded into a distal end portion of the mount boss 125. Accordingly, the front side upper portion of the ornament 12 is fixed to the extending portion 27.

As illustrated in FIG. 6, the trim board 11 includes multiple fitting members 30 that project from the back surface 10b. The fitting members 30 are arranged on the back surface 10b of the upper board 13 and the middle board 14. Each of the fitting members 30 is fitted to each fitting portion 121 of the ornament 12. Each fitting member 30 has a substantially columnar shape that projects from the back surface 10b of the trim board 11 toward the door panel, and the fitting member 30 is formed in a projection such as a boss. The fitting members 30 are arranged in predetermined positions on the back surface 10b of the opening edge portion 23 so as to correspond to the fitting portions 121 and to be fitted thereto correspondingly.

The fitting member 30A that is arranged on the back surface 10b of the middle board 14 and in the front side portion in the opening edge portion 23b that extends in the vehicular front-rear direction is fitted to the front side fixing portion 25A of the upper board 13. When the upper board 13 and the middle board 14 are assembled together, a gap is generated between a distal end of the columnar fitting member 30A and a flat plate-shaped fixing portion 25A such that the fitting portion 121 of the ornament 12 is put in the gap. Namely, the fixing portion 25A is located on the vehicular exterior side with respect to the vehicular width direction than the fixing portion 25B that is provided on the vehicular rear side. Specifically, when the ornament 12 is mounted to the trim board 11, the fitting portion 121A that is arranged in a front portion of the lower end portion 120d of the elongated decoration main body 120 is fitted to the gap between the fitting member 30A and the fixing portion 25A. Accordingly, the fitting portion 121A is located between the fitting member 30A and the fixing portion 25A. The fitting portion 121A is fixed to the fitting member 30A together with the fixing portion 25A by a screw. The screw is inserted to the mount hole 121a of the fitting portion 121A and the mounting hole 24a of the fixing portion 25A and the fitting portion 121A and the fixing portion 25A are pressed toward the distal end portion of the fitting member 30A that has a boss shape. Accordingly, the fitting portion 121A and the fixing portion 25A are fixed to the fitting member 30A with the screw and the fitting portion 121A of the ornament 12 is fixed to and held by the fitting member 30A.

The fitting member 30B that is arranged on the back surface 10b of the middle board 14 and in the rear side portion in the opening edge portion 23b that extends in the vehicular front-rear direction is fitted to the rear side fixing portion 25B of the upper board 13. When the upper board 13 and the middle board 14 are assembled together, a distal end portion of the columnar fitting member 30B is inserted to the mounting hole 25a of the flat plate-shaped fixing portion 25B. In this state, the distal end portion of the fitting member 30B is exposed toward the door panel from the mounting hole 25a of the fixing portion 25B. When the ornament 12 is mounted to the trim board 11, the fitting portion 121B that is arranged in a rear side portion of the lower end portion 120d of the elongated decoration main body 120 is arranged to correspond to the fixing portion 25B. Accordingly, the distal end portion of the fitting member 30B that is exposed from the fixing portion 25B is inserted to the mount hole 121a. The fitting portion 121B is fixed to the fitting member 30B together with the fixing portion 25B by a screw.

The fitting portion 121 is directly fitted to each corresponding one of the other fixing members 30 arranged on the back surface 10a of the upper board 12 and the middle board 13 other than the fixing members 30A and 30B and the fitting portion 121 is fixed to the corresponding fixing member 30 by a screw.

Figure 7:
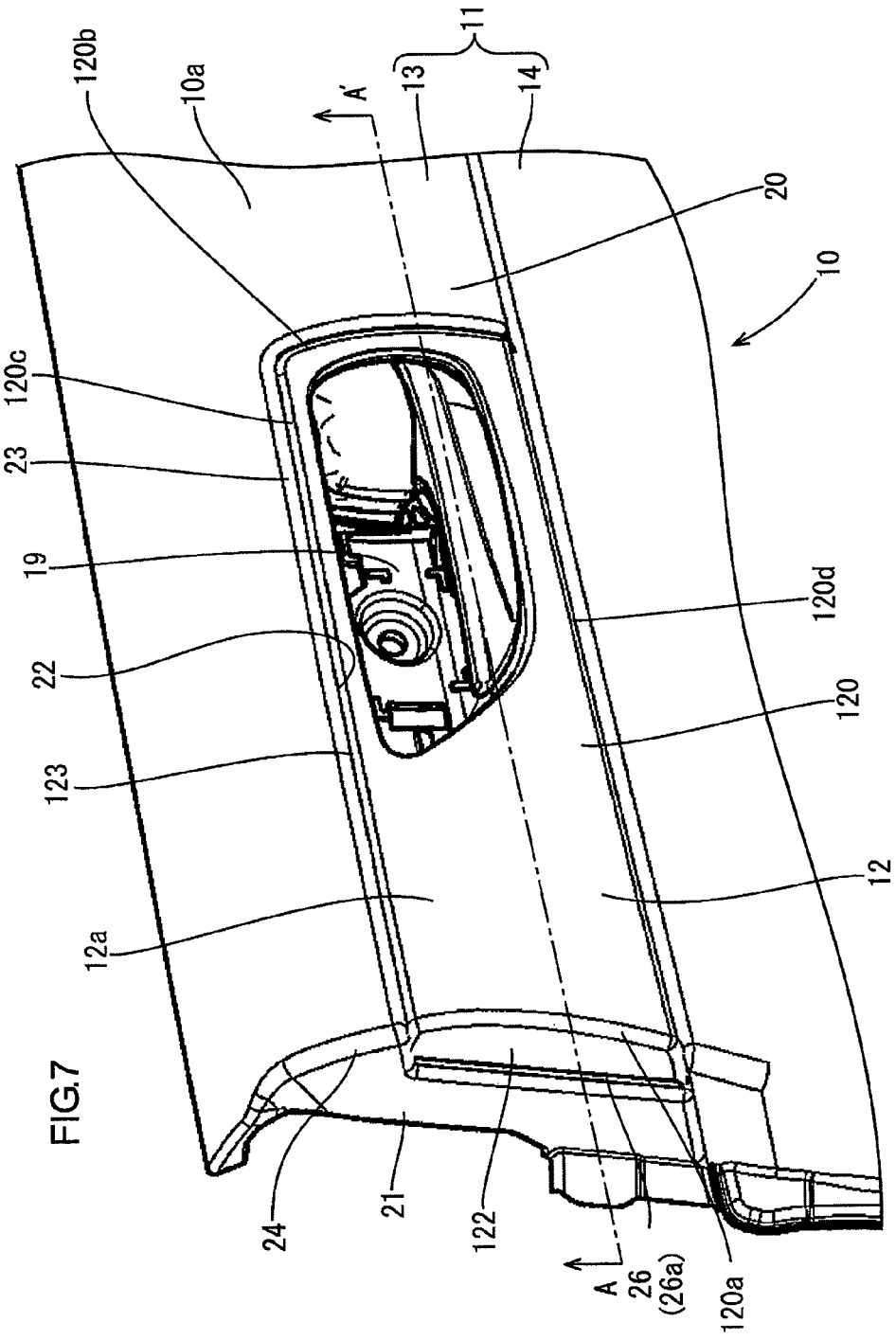
FIG. 7 is an enlarged perspective view of a part of the door trim near the ornament.

A part of the door trim 10 near the ornament 12 is illustrated in FIG. 7. As illustrated in FIG. 7, the ornament 12 is mounted to the trim board 11 such that the decoration main body 120 is fitted to the opening 22 defined by the opening edge portion 23. The insertion portion 122 that is a front side portion of the ornament 12 is located on the vehicular interior side or the front surface 10a side with respect to the trim board 11. On the other hand, the peripheral edge portion 123 of the decoration main body 120 is located on the vehicular exterior side or the back surface 10b side with respect to the trim board 11.

Figure 8:
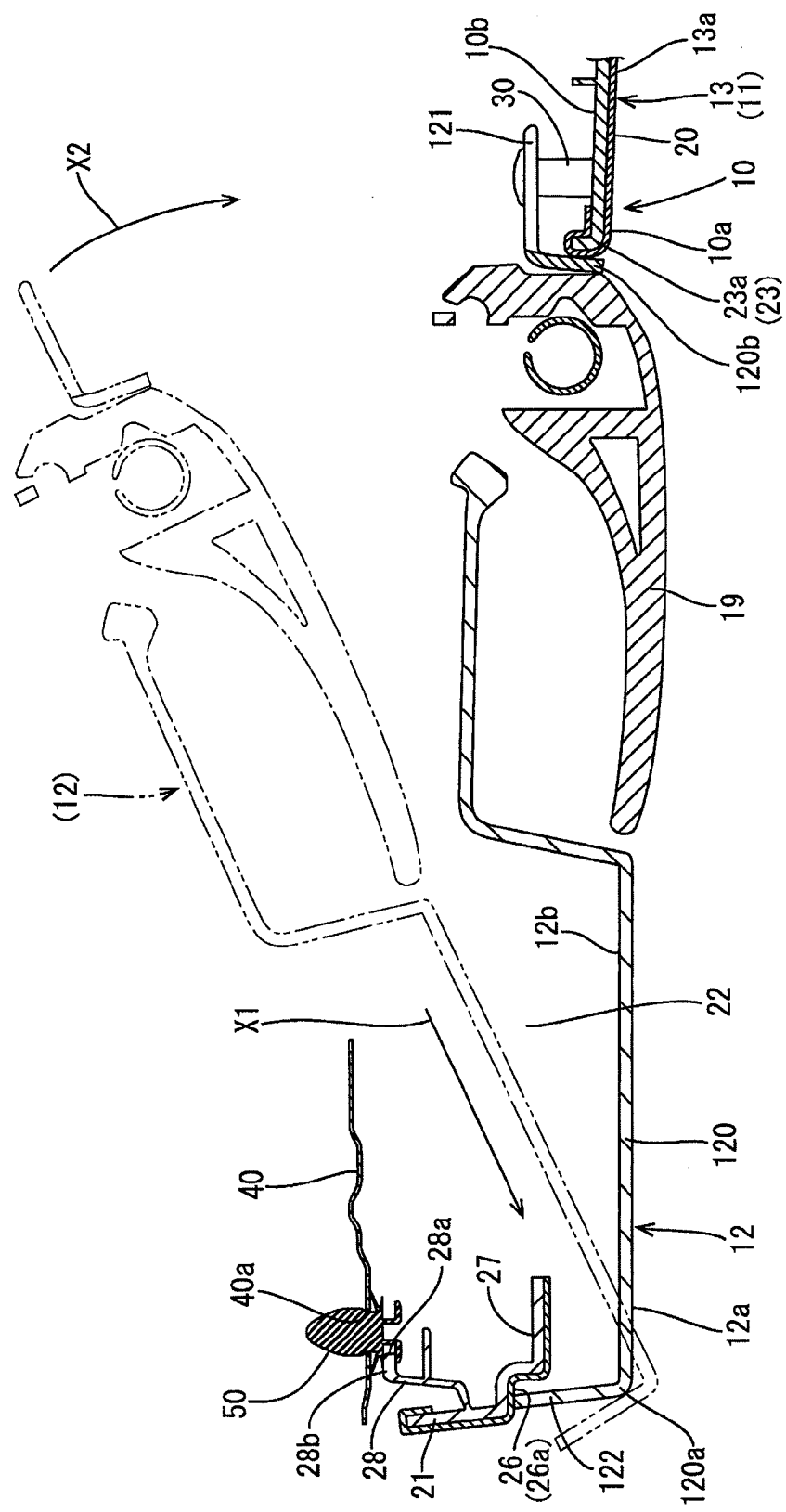
FIG. 8 is a cross-sectional view of the door trim taken along an A-A' line in FIG. 7.

A process of mounting the ornament 12 to the trim board 11 will be described. A cross-sectional configuration of the door trim 10 taken along an A-A' line in FIG. 7 is typically illustrated in FIG. 8. In FIG. 8, a skin member 13a is adhered on a surface of the trim board 11 (the upper board 13). When the ornament 12 is mounted to the trim board 11, the insertion portion 122 of the ornament 12 is inserted to the opening 22 defined by the opening edge portion 23 from the back surface 10b side to the front surface 10a side along an arrow X1 in FIG. 8. The insertion portion 122 moves through the space in the opening 22 so as not to collide with the extending portion 27.

Next, while penetrating through the opening 22, the insertion portion 122 is inclined with respect to the trim main body 20 of the trim board 11 so as to approach the receiving portion 26 from the front surface side (from the vehicular interior side). In this state, the decoration main body 120 near the insertion portion 122 covers the extending portion 27 from the front surface side. In this embodiment, when the insertion portion 122 approaches the receiving portion 26, the front side fitting portion 121A of the ornament 12 is gradually inserted to the gap between the fitting member 30A and the fixing portion 25A.

Next, the rear end portion 120b of the decoration main body 120 of the ornament 12 that is located on the opposite side from the insertion portion 122 in the elongated direction approaches the trim main body 20. Accordingly, the decoration main body 120 is fitted to the opening 22 defined by the opening edge portion 23. Namely, the ornament 12 is rotated about its front side portion such that the rear side portion thereof approaches the trim board 11 as is indicated by an arrow X2 in FIG. 8.

Figure 9:
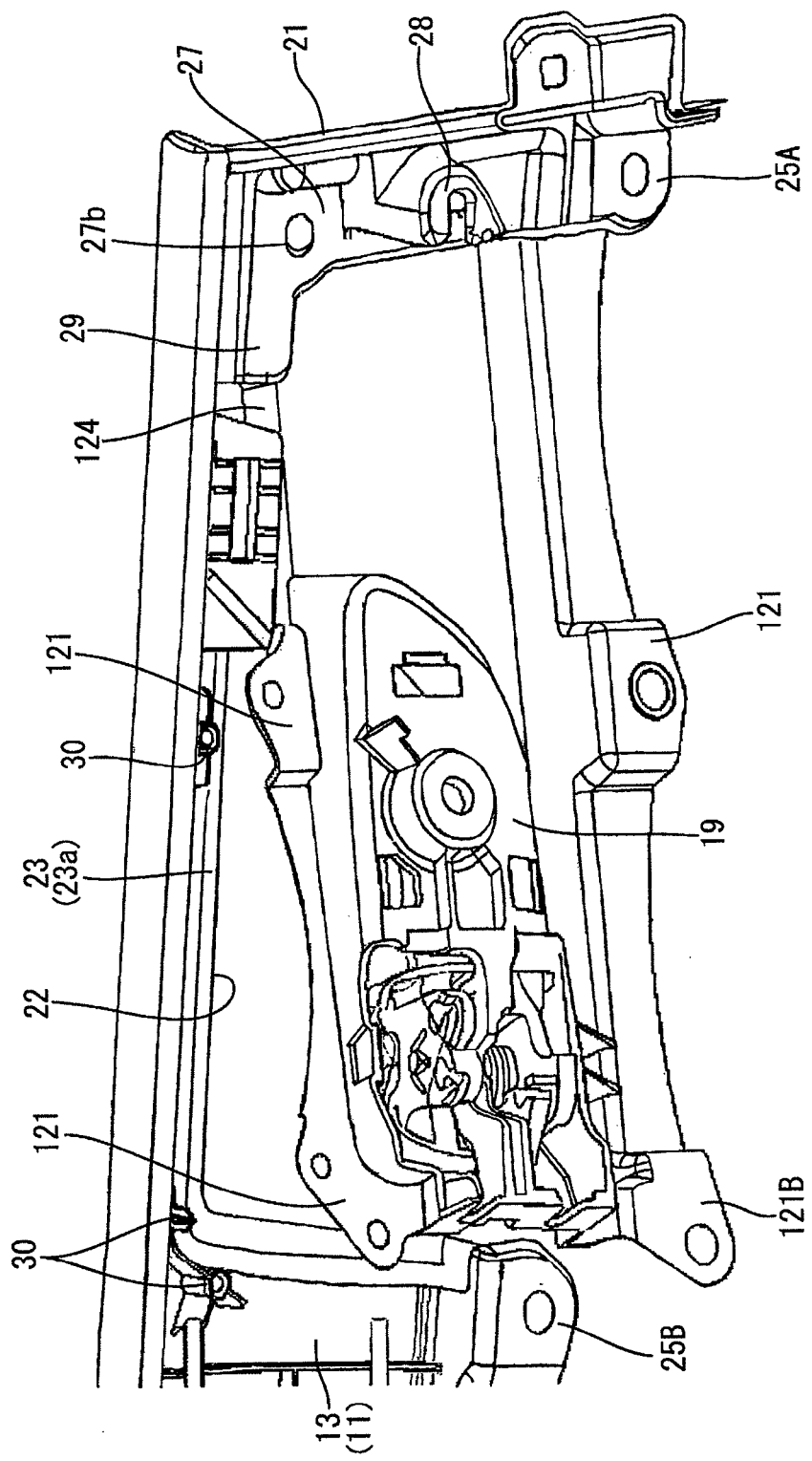
FIG. 9 is a perspective view illustrating the ornament and a part of the trim board wherein a contact portion of the ornament is in contact with a guide member.

When the decoration main body 120 is fitted to the opening 22 defined by the opening edge portion 23, the contact portion 124 of the ornament 12 is in contact with the guide member 29 of the end portion 27a of the extending portion 27. In FIG. 9, the contact portion 124 of the ornament 12 is in contact with the guide member 29 and the ornament 12 approaches the trim board 11. As illustrated in FIG. 9, the contact portion 124 of the ornament 12 is located on the vehicular exterior side relative to the guide portion 29 so as to face the guide portion 29 and to be supported by the guide portion 29. Because the contact portion 124 is in contact with and supported by the guide member 29, the insertion portion 122 of the ornament 12 is less likely to be unnecessarily inserted frontward beyond the receiving portion 26. Because the contact portion 124 is in contact with the guide member 29, the ornament 12 is stably rotated around a contact point such that the decoration main body 120 is fitted to the opening 22 defined by the opening edge portion 23.

The decoration main body 120 of the ornament 12 is fitted to the opening 22 defined by the opening edge portion 23 and accordingly, the insertion portion 122 is also fitted to the recess portion 26a of the receiving portion 26. Also, the fitting portions 121 of the ornament 12 are fitted to the fitting members 30 of the trim board 11 correspondingly. When the decoration main body 120 is fitted to the opening 22, the front side fitting portion 121A of the ornament 12 is completely inserted to the gap between the fitting member 30A and the fixing portion 25A.

Figure 10:
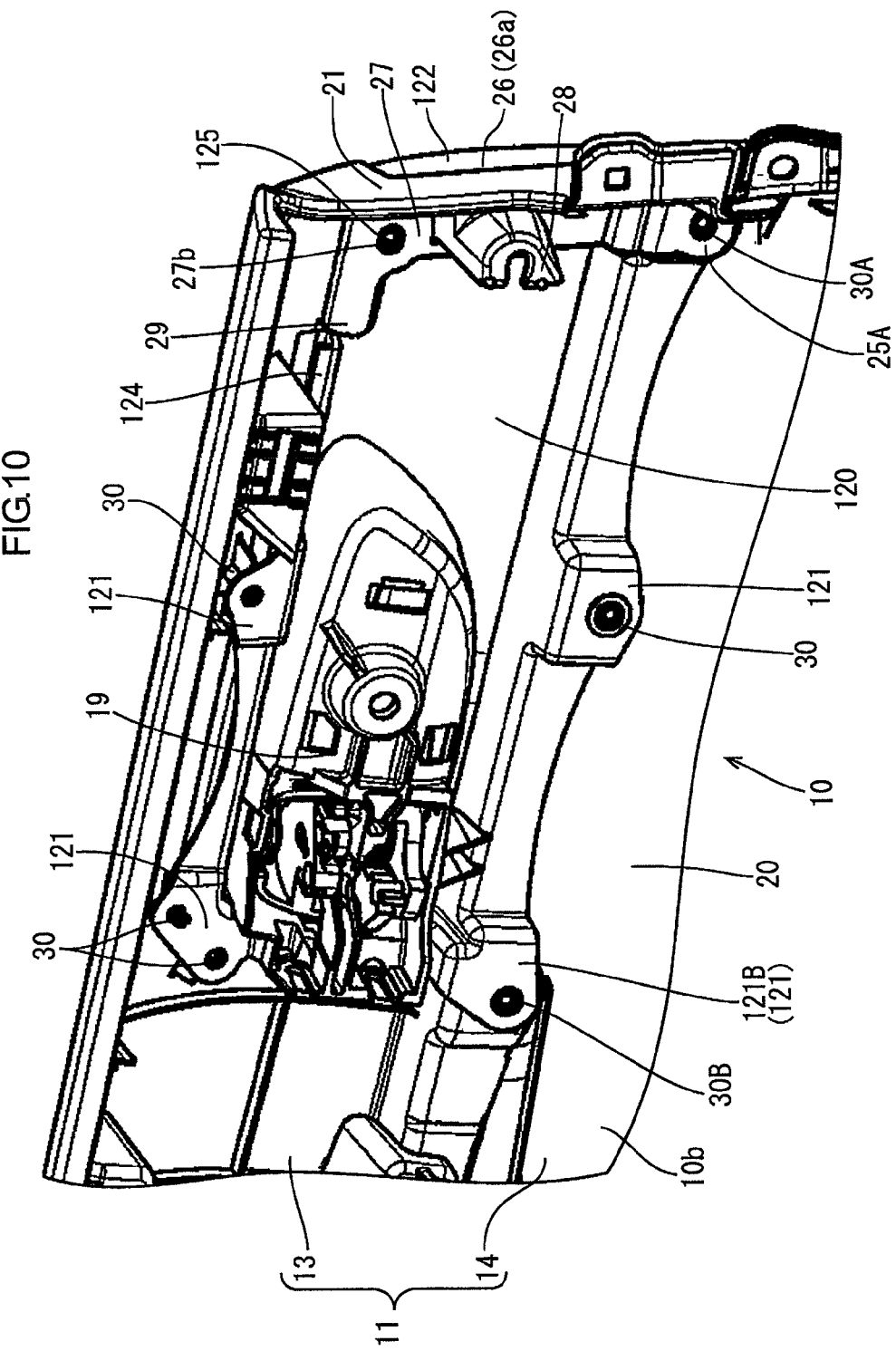
FIG. 10 is an enlarged perspective view illustrating a part of the door trim near the ornament seen from the back surface side.
Figure 11:
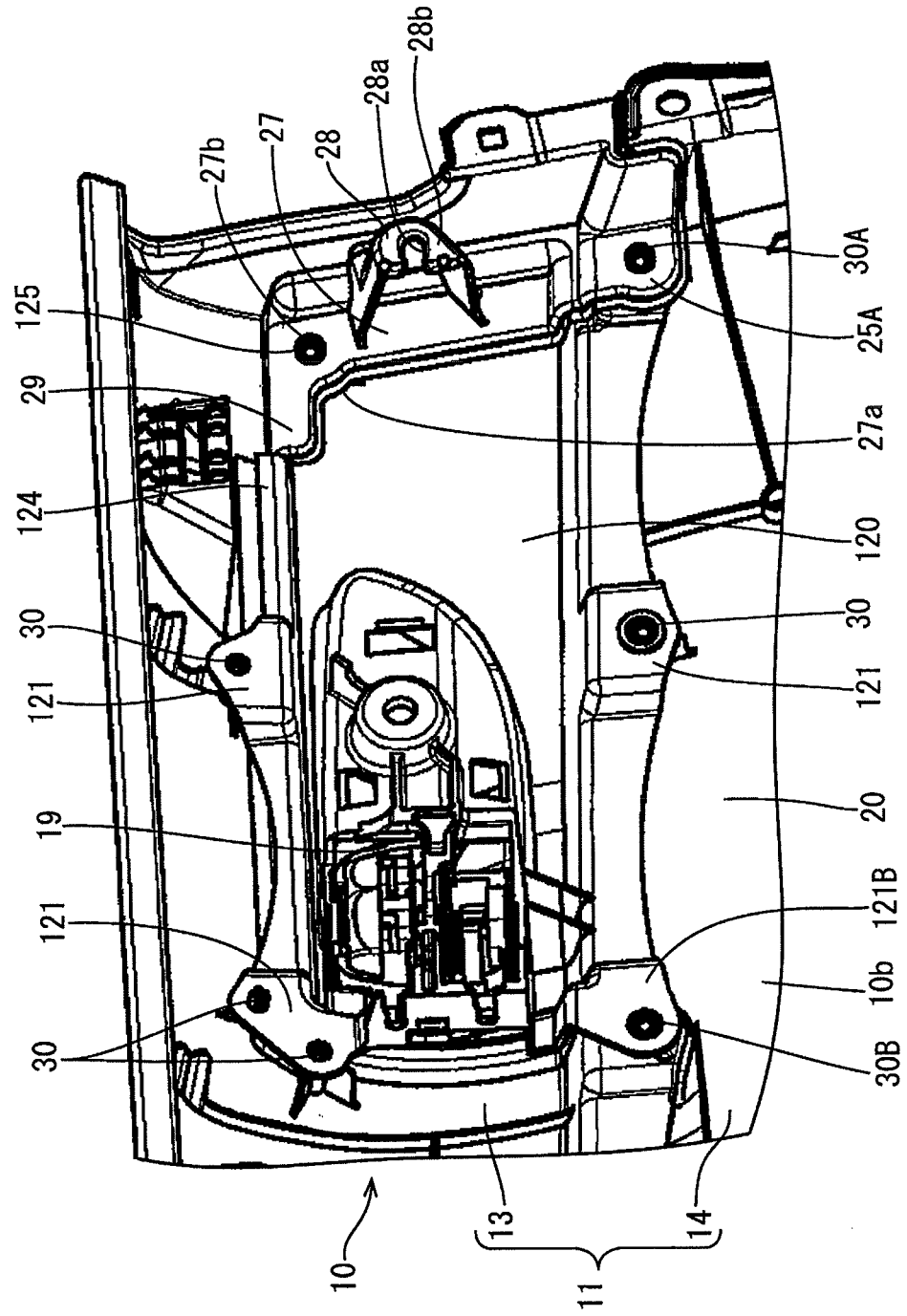
FIG. 11 is an enlarged view illustrating a part of the door trim near the ornament seen from the back surface side.

A portion of the door trim 10 near the ornament 12 seen from the back surface 10b side is illustrated in FIGS. 10 and 11. FIG. 10 illustrates a portion of the door trim 10 that is seen diagonally frontward from the back surface 10b side and FIG. 11 illustrates a portion of the door trim 10 that is seen diagonally rearward from the back surface 10b side.

As illustrated in FIGS. 10 and 11, the decoration main body 120 of the ornament 12 is fitted to the opening 22 defined by the opening edge portion 23 and the fitting portions 121 arranged on the peripheral portion of the decoration main body 120 are located to correspond to the fitting members 30 that are arranged on the back surface 10b of the opening edge portion 23. Namely, the fitting portions 121 and the fitting members 30 are arranged to overlap each other. Thus overlapped fitting portions 121 and the fitting members 30 are fixed to each other by screws (not illustrated) and the mounting of the ornament 12 to the trim board 11 is completed.

Figure 12:
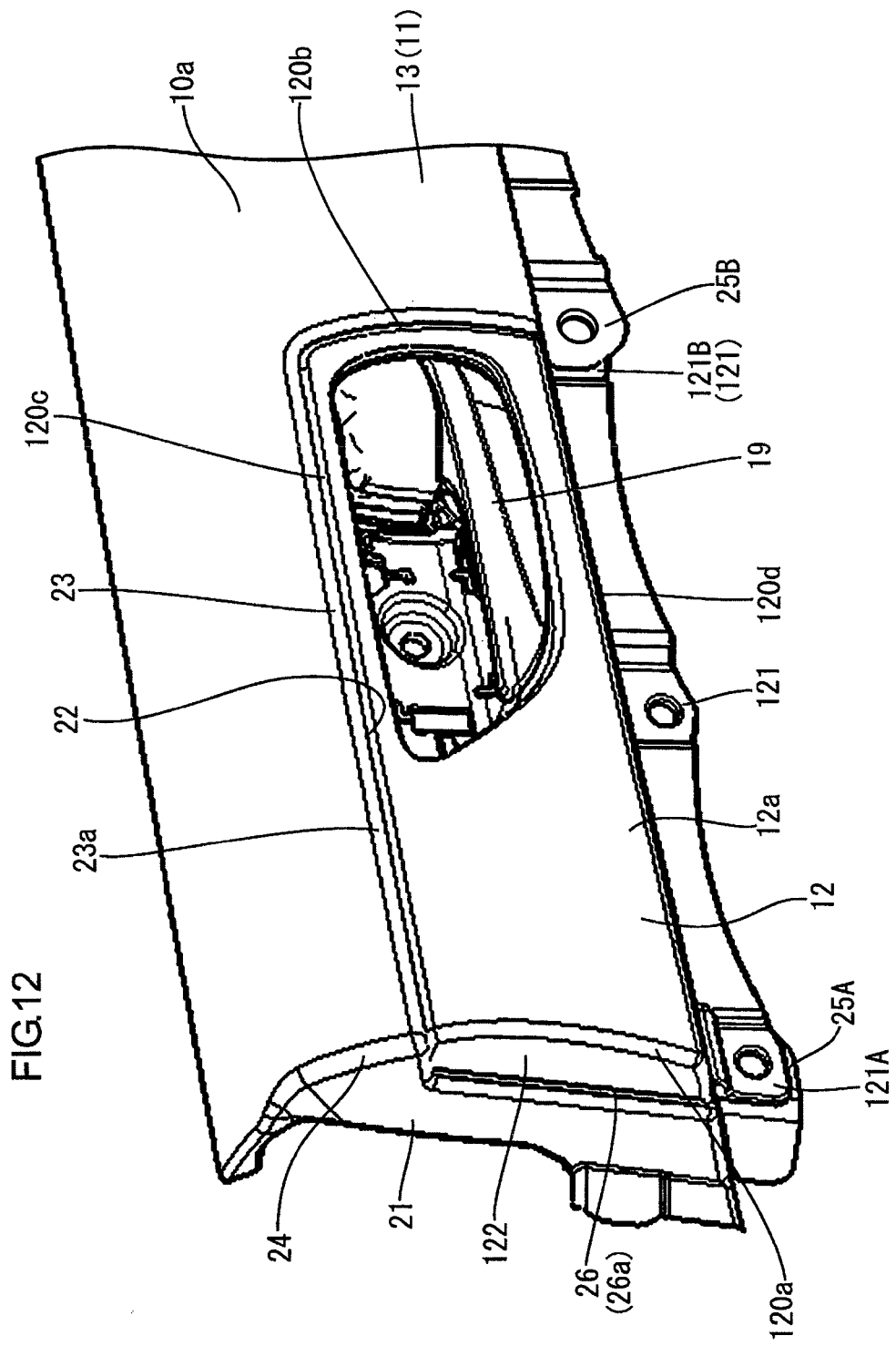
FIG. 12 is a perspective view illustrating an upper trim and the ornament that is mounted to the upper trim.

The ornament 12 that is mounted to the upper trim 13 is illustrated in FIG. 12. In FIG. 12, the door trim 10 does not include the middle board 14 for simple explanation. As illustrated in FIG. 12, the insertion portion 122 of the ornament 12 that is received by the receiving portion 26 is located closer to the vehicular interior side than a front surface of the upper trim 13 (the trim board 11). The fitting portion 121A that is near the insertion portion 122 is located closer to the vehicular interior side than the fixing portion 25A that is in the lower side portion of the upper trim 13 (the trim board 11). The fitting portions 121 that are arranged in the portion of the ornament 12 that is rear side from the insertion portion 122 and the fixing portion 25A are located on the back surface 10b side of the upper board 13 (the trim board 11).

Among the fitting portions 121 included in the ornament 12, the fitting portion 121A is located on the vehicular interior side from the fixing portion 25A unlike the other fitting portions 121. The fitting portion 121A is located closer to the front surface 12a of the ornament 12 than the other fitting portions 121. Namely, when the decoration main body 120 of the ornament 12 is fitted to the opening 22 defined by the opening edge portion 23, the fitting portion 121A is not fixed to the back surface 10b of the opening edge portion 23 unlike the other fitting portions 121. The fitting portion 121A is gradually inserted to the gap between the fitting member 30A and the fixing portion 25A when the ornament 12 is mounted to the trim board 11. Accordingly, the ornament 12 is easily guided to the correct mount position in the trim board 11.

The ornament 12 is mounted to the trim board 11 as described before to obtain the door trim 10 as illustrated in FIG. 1. As illustrated in FIG. 8, the door trim 10 is mounted to the door panel (the door inner panel) 40 from the vehicular interior side with using a clip (a stopper member) 50. The clip 50 is formed in a projected shape having a tapered tip end as a whole. A basal end portion of the clip 50 is supported by the clip seat 28.

The clip seat 28 has a flat support portion 28b that faces the door panel 40 and supports the clip 50. The support portion 28b has a substantially U-shape with a plan view seen from the back surface 10b side of the door trim 10. The support portion 28b has a hole 28a. The clip 50 has a recessed portion at its basal end side and the clip 50 is attached to the clip seat 28 such that the recessed portion is fitted to the hole 28a. The clip 50 is supported by the clip seat 28 such that its tip end faces the door panel. The tip end of the clip 50 is elastically deformable. When the door trim 10 is mounted to the door panel 40, the clip 50 supported by the clip seat 28 is pushed into a mount hole 40a of the door panel 40 until the basal end portion of the clip 50 reaches an opening of the mount hole 40a. Thus, the clip 50 supported by the clip seat 28 is pushed into the mount hole 40a and accordingly, the clip 50 is held by the door panel 40 and the door trim 10 is mounted to the door panel 40.

In the door trim 10 according to the present embodiment, the ornament 12 has a shape extending in the vehicular front-rear direction and the front side portion thereof extends beyond the outer peripheral portion of the door trim 10. The ornament 12 is arranged in the door trim 10 so as to overlap the clip seat 28 that is included in the trim board 11. The clip seat 28 is used to mount the door trim 10 to the door panel 40. In the door trim 10 according to the present embodiment, the clip seat (a mount seat) 28 is arranged in the outer peripheral portion of the trim board 11 of the door trim 10 and the ornament 12 is arranged to overlap the position of the clip seat 28. The clip (the stopper member) 50 that is used to mount the door trim 10 to the door panel is attached to the clip seat 28. With such a configuration, the clip seat 28 is not necessarily arranged in the ornament 12 and therefore, the molding errors such as sink marks are less likely to occur in the ornament 12. The sink marks may be caused by providing the clip seat on the ornament 12. In the door trim 10 according to the present embodiment, it is unnecessary to keep away from the clip seat 28 when the ornament 12 is mounted to the door trim 10 and a design of the door trim 10 (the ornament 12) is less likely to be restricted by the position of the clip seat.

In the door trim 10 according to the present embodiment, the front surface 12a of the decoration main body 120 of the ornament 12 and the front surface 10a of the trim main body 20 of the trim board 11 including the upper board 13 and the middle board 14 have a substantially a same plane and continuously form a smooth surface. A front surface of the insertion portion 122 of the ornament 12 (a surface that faces frontward and extends from the receiving portion 26) and a surface of the side wall portion 21 that faces frontward form a substantially a same plane and continuously form a smooth surface.

<Other Embodiments>

The present technology is not limited to the description as described above with reference to the drawings. For example, the present technology may include following embodiments.

(1) In the above embodiment, the ornament 12 includes the upper front end portion 120c1 of the ornament 12 in its upper side portion. However, the ornament 12 may include such a front end portion in its lower side portion.

(2) The fitting portions that are provided in the peripheral edge portion of the ornament may be provided in an end portion of the ornament that is opposite side from the insertion portion.

(3) In the above embodiment, the ornament 12 includes the inside door handle 19. However, the ornament may not include the inside door handle.

The invention claimed is:

1. A door trim comprising:
an ornament including:
   a decoration main body having a peripheral edge portion;
   ornament fitting portions at the peripheral edge portion of the decoration main body; and
   an ornament insertion portion at an end portion of the decoration main body; and
a trim board including:
   a trim main body having a plate shape having an outer peripheral portion, the trim main body having an opening to which the decoration main body is fitted and the opening being through a thickness of the trim main body, and the trim main body further having an opening edge portion defining the opening and on which the fitting portions of the ornament are provided;
   a receiving portion near the outer peripheral portion, the receiving portion being configured to receive the ornament insertion portion with the ornament insertion portion being on a vehicular interior side relative to the receiving portion such that the ornament insertion portion is exposed on a side of the outer peripheral portion of the trim main body; and
   an extending portion extending from the receiving portion to a space in the opening and overlapping the space in the opening on a vehicular exterior side relative to the decoration main body that is fitted to the opening, the extending portion including a mount seat to which a stopper member is mounted, the stopper member being configured to mount the door trim to a door panel.

2. The door trim according to claim 1, wherein the ornament further includes an ornament contact portion at the peripheral edge portion of the decoration main body so as to project from the peripheral edge portion and be in contact with an end portion of the extending portion.

3. The door trim according to claim 1, wherein the trim main body further includes a side wall portion extending from the outer peripheral portion of the trim main body and the receiving portion is integrally defined as a part of the side wall portion.

4. The door trim according to claim 1, wherein the extending portion extends from the receiving portion as a part thereof.

5. The door trim according to claim 3, wherein the extending portion extends from the receiving portion as a part thereof.

6. The door trim according to claim 1, wherein
the decoration main body has an elongated shape and includes the ornament fitting portions which include at least two ornament fitting portions on two end sides, respectively, with respect to an elongated direction, and
the trim main body includes at least two fixing portions near the opening edge portion corresponding to the at least two ornament fitting portions, respectively.

7. The door trim according to claim 6, wherein one of the at least two ornament fitting portions is provided on the vehicular interior side relative to a corresponding one of the at least two fixing portions, and the other one of the at least two ornament fitting portions is provided on the vehicular exterior side relative to another corresponding one of the at least two fixing portions.

8. The door trim according to claim 7, wherein
the trim main body includes an upper board and a middle board that are assembled to each other to define the trim main body,
the upper board includes the at least fixing portions in a lower portion thereof, and
the middle board includes at least two fitting members in an upper portion thereof, the at least two fitting members being fitted to the at least two fixing portions, respectively.

9. The door trim according to claim 7, wherein
the trim main body has at least two fitting members, and
the corresponding one of the at least two fixing portions and the one of the at least two ornament fitting portions are fixed to each other via a corresponding one of the at least two fitting members, and
the other corresponding one of the at least two fixing portions and the other one of the at least two ornament fitting portions are fixed to each other via another corresponding one of the at least two fitting members.

10. The door trim according to claim 9, wherein the corresponding one of the at least two fixing portions and the corresponding one of the at least two fitting members have a first gap therebetween and the one of the at least two ornament fitting portions is provided in the first gap, and
the other corresponding one of the at least two fixing portions and the other corresponding one of the at least two fitting members have a second gap therebetween and the other one of the at least two ornament fitting portions (121B) is provided in the second gap.

11. The door trim according to claim 1, wherein the ornament insertion portion defines a part of the outer peripheral portion of the trim main body.

12. The door trim according to claim 8, wherein
each of the at least two fixing portions has a hole and each of the at least two ornament fitting portions has a hole and each of the at least two fitting members is a projection, and
the projection is fitted to the hole of each of the at least two fixing portions and the at least two ornament fitting portions.

\* \* \* \* \*